United States Patent Office 3,737,406
Patented June 5, 1973

3,737,406
REACTIVE EPOXY-ONIUM CATALYSTS FOR SYNTHESIS OF POLYOXAZOLIDONES
Gaetano F. D'Alelio, 2011 E. Cedar St., South Bend, Ind. 46617
No Drawing. Filed Mar. 22, 1971, Ser. No. 126,947
Int. Cl. C08g 30/00
U.S. Cl. 260—47 EP
17 Claims

ABSTRACT OF THE DISCLOSURE

A process for preparing polyoxazolidones is provided in which a polyepoxide is reacted with a polyisocyanate in the presence of chemically reactive epoxyonium catalysts, selected from the class of ammonium and phosphonium halides having at least one oxirane moiety. Novel polymers are obtained when these new catalysts containing two or more oxirane groups are condensed with polyisocyanates.

BACKGROUND OF THE INVENTION

The background of the invention is in the field of synthetic polymers prepared by reacting a polyepoxide with a polyisocyanate in the presence of specific chemically coreactive catalysts. These polymers can be used as adhesives, coatings, in laminating compositions, as molding compounds, caulking pastes, potting and encapsulating substances and the like.

FIELD OF THE INVENTION

This invention relates to a process for preparing polyoxazolidones. In one aspect it relates to novel catalysts for use in the polycondensation of a polyepoxide and a polyisocyanatle. In another aspect it relates to new polyoxazolidones, in which the catalyst becomes an integral part of the polymer by reaction with the polyepoxide and polyisocyanate reactants.

DESCRIPTION OF THE PRIOR ART

The synthesis of polyoxazolidones by the condensation of polyepoxides with polyisocyanates is described in the prior patent literature. For example, U.S. Patent No. 3,020,262 discloses such a reaction in which quaternary ammonium halides are used as catalysts. However, the process is not entirely satisfactory since the polymerization rate is slow as a result of the limited solubility of the catalyst, and of homo-polymerization of the polyisocyanates and polyepoxides as side reactions. U.S. Pat. 3,334,110 describes a method in which the rate is increased by use of an aliphatic alcohol as a co-catalyst with a quaternary ammonium halide; this process requires the substantial elimination of alcohol to achieve practical properties in the polymer. Organic phosphonium halides as catalysts are disclosed in my copending application, Ser. No. 60,141, filed July 31, 1970, which catalysts, however, do not contain epoxide groups and are incapable of coreacting with the polyisocyanate or polyepoxide reactants in reaction mixture.

SUMMARY OF THE INVENTION

This invention relates to a new method for the preparation of oxazolidone derivatives. In general, it concerns the use of novel onium-halide catalysts for the condensation of polysiocyanates with polyepoxide compounds. In particular, it refers to the use of novel catalysts which coreact with the components in the polymerization system and thereby become an integral part of the polymer structure. These catalysts are selected from ammonium and phosphonium halides possessing at least one and no more than four oxirane moieties.

One class of catalysts used in the practice of this invention corresponds to the formula

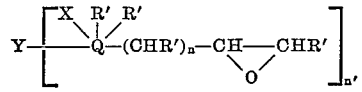

in which $n'$ has a numerical value of one and two,
Q represents the atoms P anl N, and
when $n'$ is one, Y represents R and
when $n'$ is two, Y represents R", wherein R represents a monovalent aliphatic hydrocarbon radical containing at least one and no more than ten carbon atoms,
R' is a monovalent radical selected from the class of R and aromatic hydrocarbon radicals containing six and no more than twelve carbon atoms,
R" represents a divalent aliphatic or aromatic hydrocarbon radical containing at least one and no more than twelve carbon atoms,
X represents a halogen, and
$n$ has a numerical value of zero to ten.

Thus, when $n'$ is one, the formula of the catalyst may be written as a monoepoxide species,

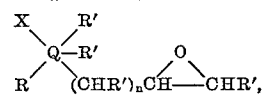

and when $n'$ is two, it may be written as a diepoxide species,

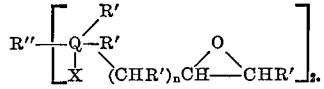

Another class of epoxy-containing onium halide catalysts suitable in the practice of this invention has the formula

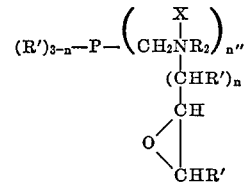

whereas a third class useful in the practice of this invention is formulated as

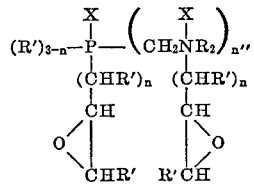

wherein

R, R', X and $n$ have the same meaning defined above, and
$n''$ has a numerical value of one to three.

These catalysts are readily synthesized by well-known procedures which involve quaternizing a tertiary base with an epoxy halide according to the following equations,

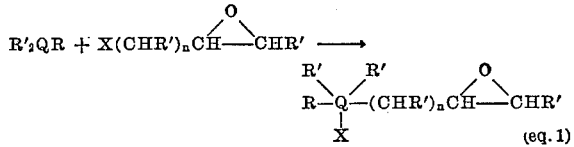

(eq. 1)

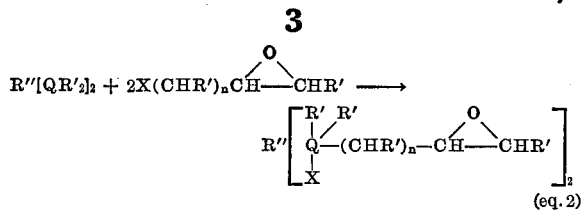

(eq. 2)

wherein Q, R, R', R", X and $n$ have the same meaning defined above. The following few specific syntheses illustrate the generalized Equations 1 and 2, among which, Equation 3 represents the synthesis of a commercially available product:

(eq. 3)

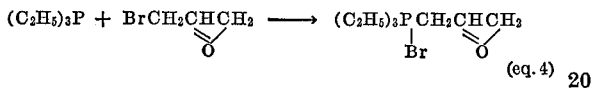

(eq. 4)

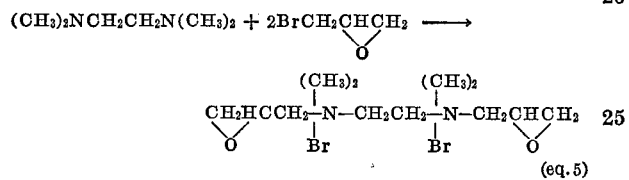

(eq. 5)

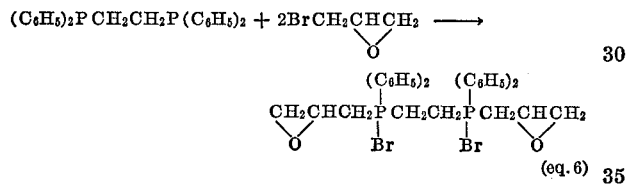

(eq. 6)

In the above formulas, X can be any halogen, such as bromine, chlorine, iodine or fluorine, but, for reasons of economy, bromine and chlorine are preferred. The monovalent hydrocarbon moiety, R, can be saturated alkane, or an unsaturated alkene or alkyne, a saturated or unsaturated cycloaliphatic and the like, such as $CH_3$, $C_2H_5-$, $C_3H_7-$, $n-C_4H_9-$, $i-C_4H_9-$, $i-C_5H_{11}-$,
$n-C_6H_{13}-$, $i-C_8H_{17}-$, $CH_2CH-$, $$CH_2=\overset{CH_3}{\underset{|}{C}}-$$

$CH_2=CHCH_2-$, $CH_3CH=CH_2-$, $CH_3CH=CHCH_2-$, $HC\equiv CCH_2-$, $CH_3C\equiv CCH_2-$;

a benzyl, e.g. $C_6H_5CH_2-$, $CH_3C_6H_4CH_2-$; a phenethyl, e.g., $C_6H_5CH_2CH_2-$, $ClC_6H_4CH_2CH_2-$; a cyclohexyl, e.g. $C_6H_{11}-$; a cyclohexenyl, e.g. $C_6H_9-$, etc.; preferably R groups containing one to six carbon atoms are preferred for reasons of economy and reactivity. When R' is not R, it may be an aromatic hydrocarbon such as, e.g., $C_6H_5-$, $o-CH_3-C_6H_4-$, $m-CH_3-C_6H_4$, $p-CH_3C_6H_4-$, $2,4-(CH_3)_2C_6H_3-$, $2,5-(CH_3)_2C_6H_3-$,
$2,3,5-(CH_3)_3C_6H_2-$, $2,4,6-(CH_3)C_6H_2-$, $4-C_3H_7C_6H_4-$, $2,4-(C_2H_5)_2C_6H_3-$, as well as substituted aromatic hydrocarbons such as their halo-, sulfoxy-, oxy-, keto- etc. derivatives in which the aromatic nucleus remains attached to Q, such as $C_6H_5OC_6H_4-$, $C_6H_5SO_2C_6H_4-$, $C_6H_5COC_6H_4-$, $ClC_6H_4-$, $Cl_2C_6H_3-$, etc.

The divalent hydrocarbon, R", can be selected from aliphatic and aromatic structures such as alkylene, substituted alkylenes, alkyleneoxy, alkenylene, substituted alkenylene, arylene, substituted arylene and the like. Typical examples of R" are $-CH_2-$, $CH_2CH_2-$, $-CH_2CH_2CH_2-$, $-CH_2CH_2CH_2CH_2-$,
$-H_2CHC=CHCH_2-$, $-H_2CC\equiv CCH_2-$,
$-H_2CC_6H_4CH_2-$, $C_6H_4-$, $H_2CCH_2C_6H_4CH_2CH_2-$, $H_2CCH_2SCH_2CH_2-$, etc. While some R, R' and R" radicals contain O, $SO_2$, CO and Cl and therefore, are not entirely hydrocarbon, they are predominantly hydrocarbon and for the purposes of this invention, are regarded as such. Additional examples of R" are given hereinafter by Z, the symbol used in the description of the polyepoxides and the polyisocyanates.

A few typical specific examples of reactive epoxyonium catalysts, in addition to those illustrated in Equations 3-6 inclusive are

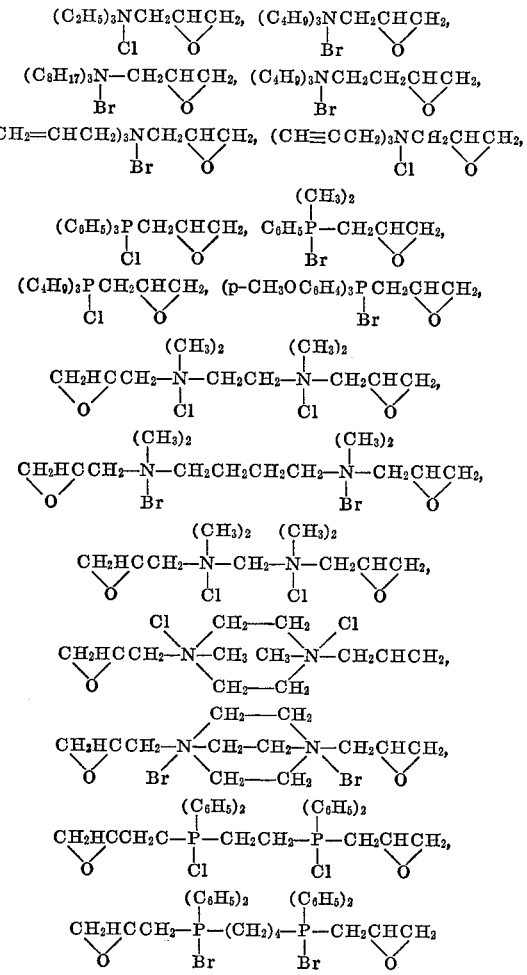

mixed ammonium-phosphonium derivatives of the general formula, for example,

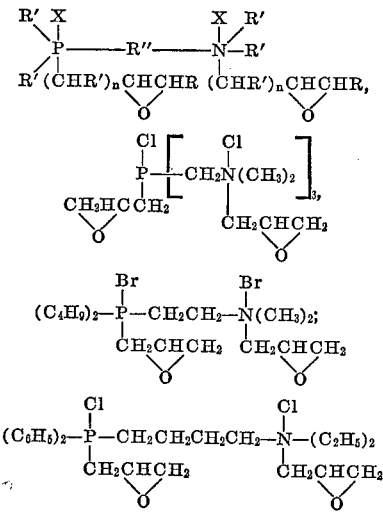

$$(C_4H_9)_2\underset{\underset{O}{\overset{|}{\underset{CH_2CHCHCH_3}{|}}}}{\overset{Br}{\overset{|}{P}}}-CH_2CH=CHCH_2-\underset{\underset{O}{\overset{|}{\underset{CH_3CHCHCH_3}{|}}}}{\overset{Br}{\overset{|}{N}}}-(CH_3)_2,$$

$$(C_6H_5)_2\overset{Cl}{\overset{|}{P}}CH_2N(CH_3)_2,\ P\left[\overset{Cl}{\underset{\underset{O}{\overset{|}{\underset{CH_2CHCH_2}{|}}}}{\overset{|}{CH_2\overset{+}{N}(CH_3)_2}}}\right]_3.$$

These epoxy-onium catalysts under the reactions of epoxides and therefore they can react with the isocyanates as well as coreact with the epoxide compounds present in the system. Furthermore, these epoxy-onium catalysts react with isocyanate moieties to yield oxazolidone moieties. This reactivity is readily established by prototype reactions with monoisocyanates, thus for example $$R-\underset{X}{\overset{(R')_2}{\overset{|}{Q}}}-(CHR')_n\underset{O}{\overset{\diagdown\diagup}{C}HCHR'} + C_6H_5NCO \longrightarrow$$

$$R-\underset{X}{\overset{(R')_2}{\overset{|}{Q}}}-(CHR')_n-\underset{O}{\overset{R'CH-N-C_6H_5}{\overset{|\ \ \ \ \ |}{CH\ \ \ \ C=O}}}$$
(Eq. 7)

$$R''-\left[\underset{X}{\overset{(R')_2}{\overset{|}{Q}}}-(CHR')_n\underset{O}{\overset{\diagdown\diagup}{C}HCHR'}\right]_2 + 2C_6H_5NCO \longrightarrow$$

$$R''-\left[\underset{X}{\overset{(R')_2}{\overset{|}{Q}}}-(CHR')_n-\underset{O}{\overset{R'CH-N-C_6H_5}{\overset{|\ \ \ \ \ |}{CH\ \ \ \ C=O}}}\right]_2$$
(Eq. 8)

Still further, when a diepoxide onium compound of this invention reacts with a polyisocyanate, for example, a diisocyanate, polymer formation occurs with the formation of an oxazolidone moiety, incorporting the oxonium halide into the molecular structure of the polymer, as illustrated by the equation $$nCH_2CHCH_2-\underset{Br}{\overset{(CH_3)_2}{\overset{|}{N}}}-CH_2CH_2-\underset{Br}{\overset{(CH_3)_2}{\overset{|}{N}}}-CH_2CHCH_2 +$$

$$n(CH_3)N_6H_3-(NCO)_2 \longrightarrow$$

$$\left[-\underset{O=C}{\overset{N-CH_2}{\overset{|\ \ \ \ \ |}{\underset{O}{\diagdown\diagup}}}}\ HC-CH_2-\underset{Br}{\overset{(CH_3)_2}{\overset{|}{N}}}-CH_2CH_2-\underset{Br}{\overset{(CH_3)_2}{\overset{|}{N}}}-CH_2-\underset{O}{\overset{CH_2-N-(CH_3)C_6H_3}{\overset{|\ \ \ \ \ |}{CH\ \ \ C=O}}}-\right]_n$$
(Eq. 9)

Similar reactions occur with the di- and polyepoxides of the phosphonium halides.

By the term polyepoxide is meant a compound having at least two epoxy, or oxirane, groups of the structure $$>C\underset{O}{\overset{\diagdown\diagup}{—}}C<$$

the oxirane structure is characterized by having an oxygen atom attached to two adjacent carbon atoms. The polyepoxide may possess more than two oxirane groups and the number may be as high as ten, or twenty or even a hundred or more, as in the case of the polyglycidyl acrylates and methacrylates $$\left[-CH_2-\underset{\underset{O}{\overset{|}{\underset{COOCH_2CHCH_2}{|}}}}{\overset{CH_3}{\overset{|}{C}}}-\right]_n$$

prepared by the procedure given in the Journal of Macromolecular Science-Chemistry, A3(5), 1207 (1969). The polyepoxide reactants suitable for use in the preparation of polyoxazolidones are essentially unlimited. The particular polyepoxide selected for use will depend on such factors as the properties desired in the polymer, cost, reactivity, commercial availability and on practical as well as theoretical considerations. The polyepoxides can be saturated, unsaturated, aliphatic, cycloaliphatic, aromatic and heterocyclic, and can be written as $$Z\left(C\underset{O}{\overset{\diagdown\diagup}{—}}C\diagdown\right)_m$$

wherein $m$ is a numerical value of at least two and Z is a polyvalent organic radical selected from aliphatic and aromatic structures such as alkylene, substituted alkylenes, alkyleneoxy, alkenylene, substituted alkenylene, arylene, substituted arylene, aliphatic amide, aromatic amides and imides and the like, as shown for $Z(NCO)_m$ hereinafter. Useful polyepoxides include glycidyl ethers derived from epichlorohydrin adducts of polyols and polyhydric phenols. A particularly suitable epoxide is the diglycidyl ether of bisphenol A of the formula $$CH_2\underset{O}{\overset{\diagdown\diagup}{—}}CH-CH_2-O-\underset{}{\overset{}{\bigcirc}}-\underset{\underset{CH_3}{|}}{\overset{\overset{CH_3}{|}}{C}}-\underset{}{\overset{}{\bigcirc}}-O-CH_2-CH\underset{O}{\overset{\diagdown\diagup}{—}}CH_2$$

Additional examples of other polyepoxides are:
resorcinol diglycidyl ether;
3,4-epoxy-6-methylcyclohexylmethyl-9,10-epoxystearate,
1,2-bis(2,3-epoxy-2-methylpropoxy)ethane,
the diglycidyl ether of
2,2-(p-hydroxyphenyl) propane,
butadiene dioxide,
dicyclopentadiene dioxide,
pentaerythritol tetrakis(3,4-epoxycyclohexanecarboxylate),
vinylcyclohexene dioxide,
divinylbenzene dioxide,
1,5-pentadiol bis(3,4-epoxycyclohexanecarboxylate),
ethylene glycol bis(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate),
2-butene-1,4-diol bis(3,4-epoxy-6-methylcyclohexanecarboxylate),
1,1,1-trimethylolpropane tris(3,4-epoxycyclohexanecarboxylate),
1,2,3-propanetriol tris(3,4-epoxycyclohexanecarboxylate),
dipropylene glycol bis(2-ethylhexyl-4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate),
3,4-epoxycyclohexylmethyl 3,4-epoxycyclohexanecarboxylate,
3,4-epoxy-1-methylcyclohexylamethyl 3,4-epoxy-1-methylcyclohexanecarboxylate,
bis(3,4-epoxycyclohexylmethyl) pimelate,
bis(3,4-epoxy-6-methylenecyclohexylmethyl) maleate,
bis(3,4-epoxy-6-methylcyclohexylmethyl) succinate,
bis(3,4-epoxy-6-methylcyclohexylmethyl) oxalate,
bis(3,4-epoxy-6-methylcyclohexylmethyl) sebacate,
bis(3,4-epoxy-6-methylcyclohexylmethyl) adipate,
bis(3,4-epoxycyclohexylmethyl) terephthalate,
bis(3,4-epoxy-6-methylcyclohexylmethyl) terephthalate;
2,2'-sulfonyldiethanol bis(3,4-epoxycyclohexanecarboxylate),
N,N'-ethylene bis (4,5-epoxycyclohexane-1,2-dicarboximide),
di(3,4-epoxycyclohexylmethyl) 1,3-tolylenedicarbamate, 3,4-epoxy-6-methylcyclohexanecarboxaldehyde acetal,
3,9-bis(3,4-epoxycyclohexyl)-spirobi-(metadioxane),

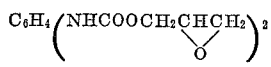

etc.

Another class of suitable polyepoxide reactant is the polyglycidyl ether-terminated organic polyhydric alcohols having molecular weights from about 100 to 4,000, and particularly from about 150 to 1,000. The polyhydric alcohols, e.g., having two or three hydroxy groups, are preferably: poly(oxyalkylene) glycols; alkylene oxide adducts of aliphatic polyols; and polyhydroxy phenolic compounds. The alkylene groups of the poly(oxyalkylene) glycols and alkylene oxides can have from two to four carbon atoms, and particularly from two to three carbon atoms. The poly(glycidyl ether) terminated polyhydric alcohols (polyols) can be represented by the formula

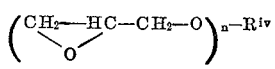

wherein $n$ is an integer such as two or three, and $R^{iv}$ represents the polyol residue after removal of terminal hydroxy groups. The diglycidyl ether of bisphenol A is a satisfactory example of such polyepoxides, as shown in the formula given hereinabove. Illustrative of other polyglycidyl ethers of polyols of the above formula, there can be mentioned those prepared by the reaction of: about two moles of epichlorohydrin with one mole of a polyethylene glycol or polypropylene glycol having a molecular weight of 200, 400, or 800, or with one mole of tetramethyleneglycol, tetrapropylene glycol and the like, respectively, or about three moles of epichlorohydrin with trimethylol propane or its adducts with ethylene- or propylene-oxide, etc.

Additional examples of polyepoxide compounds are given in U.S. Pats. 3,334,110; 3,341,337; 3,415,901; 3,440,230 to which reference is hereby made.

By the term polyisocyanate is meant a compound having at least two- —NCO groups. The polyisocyanates used in the preparation of the polyoxazolidones are represented by the formula $Z'(NCO)_m$, wherein $m$ has the same meaning as above. $Z'$ represents Z but can also include radicals such as —R"—Q'—R"— where Q' can be a divalent moiety such as —O—, —O—R"—O—, —CO—, —CO$_2$—, —NH—, —CONH—, —S—,

—SO$_2$—

—S—R"—S—, and the like. Some typical examples of such compounds include: hexamethylene diisocyanate, xylylene diisocyanates, (OCNCH$_2$CH$_2$CH$_2$OCH$_2$)$_2$, 1-methyl - 2,4 - diisocyanatocyclohexane, phenylene diisocyanates, tolylene diisocyanates, chlorophenylene diisocyanates, polyhalophenylene diisocyanates, diphenylmethane - 4,4' - diisocyanate, naphthalene - 1,5 - diisocyanate, triphenylmethane - 4,4',4" - triisocyanate, xylene - α,α'-diisothiocyanate, isopropylbenzene-α, 4-diisocyanate, etc.

Among the useful polyisocyanate reactants are included dimers and trimers of isocyanates and diisocyanates and polymeric diisocyanates of the general formula (Z'NCO)$_x$ and [Z'(NCO)$_x$]$_y$, in which $x$ and $y$ are two or more, as well as compounds of the general formula, M(NCO)$_x$, in which $x$ is two or more, and M is a polyfunctional atom or group, which includes such compounds as ethylphosphonic diisocyanate, C$_2$H$_5$P(O)(NCO)$_2$; phenylphosphonic diisocyanate, C$_6$H$_5$P(NCO)$_2$; compounds containing a ≡Si—NCO group, isocyanates derived from sulfonamides, Z(SO$_2$NCO)$_x$; and the polyisocyanates which are obtained by phosgenation of the reaction product of aniline and formaldehyde as given by the following general formula:

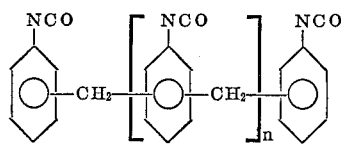

wherein $n$ equals zero to ten.

Further included among the polyisocyanates are the isocyanate prepolymers, many of which are commercially available for current use in the preparation of polyurethane products. These prepolymers are prepared, as is well known, by end-capping polyol reactions with diisocyanates, one mole of diisocyanate per each mole of hydroxyl group in the presence of a catalyst, usually an organic stannate derivative. Additional examples of polyisocyanates are given in U.S. Pats. 3,334,110; 3,415,901; 3,440,230 and 3,458,527 to which reference is hereby made.

In the absence of catalysts the reactions of an epoxide with an isocyanate does not occur at room temperature and only very slowly, if at all, at 100° C. In this invention, the amount of catalyst used depends on the nature or the natures of both the polyepoxide and of the polyisocyanates to be reacted, the temperature of the reaction and the absence or presence of solvents which tend to decrease the rate of reaction. Thus, when the onium halides of this invention are used as catalysts for an epoxide-isocyanate reaction, the quantity of catalyst used can vary over a wide range, from about 0.005% to 10% or more by weight of the epoxide and isocyanate reactants, the preferred range being about 0.1% to 5% of the combined weight of the polyepoxide and the isocyanate, about 2% being usually an upper satisfactory limit in most cases. However, when an onium halide is used alone to prepare a polymer by reaction with a polyisocyanate it also acts to catalyze the reaction and in equal molar ratios, it constitutes 50 mole percent of the polymer reactants, and if one-half mole of the onium halide is replaced by one-half mole of a polyepoxide, then the onium halide, as catalyst and reactant, will constitute 25 mole percent of the reactants. Similarly, if the onium halide is reacted directly with a polyepoxide, as catalyst and reactant, it may constitute as much as 50 mole percent of the reactants. The onium halide catalyst may be added directly by the simple expediency of mixing it together with the composition components at room temperature in those cases where the components are liquid or not too viscous at room temperature, or at slightly higher than room temperature to cause a decrease in viscosity to facilitate mixing. The incorporation of the catalyst into the reaction mixture can, in all cases, whether the mixture is liquid or solid, be facilitated by the use of solvent, if desired, by preparing the catalyst as a solution in a suitable solvent, preferably a solvent which does not react with the components in the reaction mixture, such as dioxane, ethyl ether, tetrahydrofuran, acetone, methyl ethyl ketone, glycol dimethyl ether, ethyl acetate, and the like.

Most of the polyepoxides are fluid or viscous liquids at room temperature, or become very fluid when heated to higher temperatures of the order of 75–100° C., and in liquid form are good solvents for polyisocyanates, forming homogeneous solutions readily without the need of solvents. In such cases, if the practical advantage of solventless compositions are required in specific applications, or are desired for economic reasons, the catalysts can be added to the homogeneous mixture of reactants, or it can be added to one of the reactants which is then added to the remainder of the reactant system. However, in some cases, when one or more of the reactants are high melting or are highly aromatic with poor solvent properties for the other reactants, solvents are used to achieve homogeneity of the reactants. If it is desired to use a solvent initially as the reaction medium, even in those systems in which the reactants are mutually soluble, to prepare coating compositions and the like, there can be used alone, or as mixtures with each other, such common low-cost solvents as the ketones, for example, acetone, methylethyl ketones, isophorone, cyclohexanone, etc.; the esters, such as ethyl acetate, butyl acetate, isopropyl propionate, etc.; the glycol and diethylene glycol ethers, such as the dimethyl ether, the dibutyl ether, etc.; the cyclic ethers, such as dioxane, tetrahydrofuran, the halogenated solvents, such as methylene dichloride, ethylene dichloride, trichloroethylene, chloroform, carbon tetrachloride, and the like. In those cases where more active solvents are required, as in the highly aromatic systems, aprotic polar solvents can be used alone or admixed with the poorer low-cost solvents indicated above or with hydrocarbon solvents such as benzene, toluene, heptane, cyclohexane, and the like.

A particularly useful class of active solvents are the normally liquid N,N-dialkylcarboxylamides of which the lower molecular weight species are preferred, for example, N,N - dimethylformamide and N,N - dimethylacetamide, N,N-diethylformamide, N,N-dimethylmethoxyacetamide, N-methyl-caprolactam, as well as dimethyl sulfoxide, N-methyl-2-pyrrolidone, tetramethylurea, dimethyl sulfone, hexamethylphosphoramide, formamide, N-methylformamide, butyrolactone, succinonitrile, dimethylsulfoxide, tetramethylenesulfoxide, N-acetyl-2-pyrrolidone, nitroethane, nitropropane, etc.

Solvents of the type indicated above can also be added during the course of the polymerization reaction. As the reaction proceeds, a substantial increase in viscosity of the system occurs, and solvents can be added to the partially polymerized composition, if desired, to decrease its viscosity for a specific application.

The polymerization reactions can be performed over a wide range of temperatures which depend on the nature of the reactants, the concentration of catalyst and the absence or presence of solvents from about room temperature to as high as up to about 200° C. At constant catalyst concentration, the rate increases with temperature; at constant temperature the rate increases with catalyst concentration. At high catalyst concentrations, the reactions occur readily at ambient temperature; at low catalyst concentrations, temperatures in the range of 50–150° C. are generally satisfactory and in all cases postheating, at higher temperatures up to about 200° C. can be used to assure completeness of the reaction.

The reaction between an epoxide moiety and an isocyanate moiety produces an oxazolidone ring,

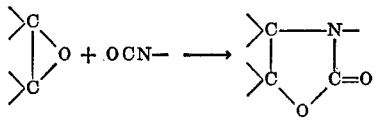

and in the case where polyfunctional reactants are used, propagation yields the class of polymers known as polyoxazolidone, as illustrated by the reaction between a diepoxide, symbolized for this purpose by

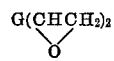

and a diisocyanate symbolized by G'(NCO)₂. At equal molar ratios the resulting polymer is terminated by one —NCO and one epoxide function thus:

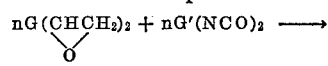

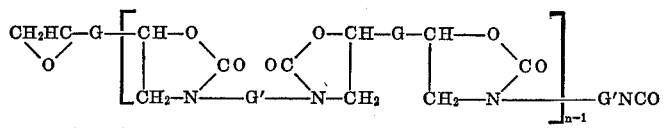

but when either the diepoxide or the diisocyanate is used in excess, as for example, at a ratio of n:n+1, the polymer is terminated at both ends by the reactant used in excess, the range being of the order of about 1:1 to 2:3, preferably 1:1 to 1:1.3.

Similar considerations apply to other polyfunctional reagents when they contain more than two functional groups, and in such cases the mole ratio is based on the number of reactive groups in each reactant.

The polymerizations can be interrupted at any intermediate fluid or viscous stage for whatever use is intended, such as for filament winding, coating, impregnation, potting, laminating, adhesive applications, etc. Since the terminal groups of the polymers can undergo the reactions characteristic of such groups, they can be mixed, at an intermediate stage, with unpolymerized mono- or poly-epoxides, mono- or polyisocyanates, polyols, polyamines, phenol-formaldehyde, resins, melamine-formaldehyde resins, etc., with which they can coreact further, or they can be compounded with dyes, pigments, lubricants, fillers, such as wood flour, alpha cellulose, cotton fibers, mica, silica, asbestos, alumina, aluminum, etc., for use as molding compounds and the like.

The polymers have a wide range of application and uses, such as for electrical potting, encapsulant and casting, caulking, adhesive, concrete cementing agents, filament windings, paneling and flooring, molding resins and compounds, prepegs, tooling compositions, adhesives, glass, cloth and paper laminates, electronic insulation, etc.

Numerous phosphines are available commercially for conversion to the mono- and poly-epoxy onium compounds used in the practice of this invention by the reactions given by Equations 1–6 hereinabove. A few, among those available from commercial sources listed in the 1970–1971 Laboratory Guide of the American Chemical Society, Aldrich Chemical Company, Inc. Catalogue Number 15, and Eastman Organic Chemicals List No. 45 are:

tris(dimethylamino)phosphine, $P(N(CH_3)_2)_3$;
diphenyl-p-tolyl phosphine, $p\text{-}CH_3C_6H_4P(C_6H_5)_2$;
bis-(1,2-diphenyl phosphino)-ethane,
  $(C_6H_5)_2PCH_2CH_2P(C_6H_5)_2$;
triallyl phosphine, $(CH_2=CHCH_2)_3P$;
trivinyl phosphine, $(CH_2=CH)_3P$;
triisopropyl phosphine, $(i\text{-}C_3H_7)_3P$;
trimethyl phosphine, $(CH_3)_3P$;
bis(2-diphenylphosphinoethyl) phenyl phosphine,
  $C_6H_5P[CH_2CH_2P(C_6H_5)_2]_2$;
1-diphenylphosphino-2-diphenylarsinoethane,
  $(C_6H_5)_2PCH_2CH_2As(C_6H_5)_2$;
tris(2-diphenylphosphinoethyl) phosphine,
  $[(C_6H_5)_2PCH_2CH_2]_3P$;
cis-bis(1,2-diphenylphosphino) ethylene,
  cis-$(C_6H_5)_2PCH=CHP(C_6H_5)_2$;
trans-bis(1,2-diphenylphosphino) ethylene,
  trans-$(C_6H_5)_2PCH=CHP(C_6H_5)_2$;
n-butyldiphenyl phosphine, $(n\text{-}C_4H_9)P(C_6H_5)_2$;
dicyclohexylphenyl phosphine, $(C_6H_{11})_2PC_6H_5$;
divinylphenyl phosphine, $(CH_2=CH)_2PC_6H_5$;
tris(2-ethylhexyl) phosphine, $(C_8H_{17})_3P$;
tris(p-methoxyphenyl) phosphine, $(p\text{-}CH_3OC_6H_4)_3P$;
tri-phenyl phosphine, $(C_6H_5)_3P$;
bis-(1,2-diphenylphosphinoethane),
  $(C_6H_5)_2PCH_2CH_2P(C_6H_5)_2$;
trioctyl phosphine, $(C_8H_{17})_3P$;
methyldiphenyl phosphine, $CH_3P(C_6H_5)_2$;
methylene bis-diphenyl phosphine, $CH_2[P(C_6H_5)_2]_2$;
tributyl phosphine, $(C_4H_9)_3P$;
pentafluorophenyl-diphenyl phosphine, $C_6H_5P(C_6H_5)_2$;
  etc.

and phosphines having active hydrogens such as $PH_3$; monosubstituted phosphines or halides, such as $RPH_2$, RPX$_2$ and disubstituted phosphines or halides, R$_2$PH, R$_2$PX from which other substituted phosphines or mixed phosphine-t-amine compounds are prepared, for example, by the well-known reaction of a phosphine containing a P—H group with an aldehyde, RCHO, for example formaldehyde, acetaldehyde, propionaldehyde, acrolein, crotonaldehyde in the presence of a secondary amine, R$_2$NH, for example dimethylamine, diethylamine, diallylamine, dipropargylamine, diethanolamine, etc., which in turn are converted to the reactive epoxy onium halide catalysts of this invention by quaternization, as for example by reaction with a haloepihydrin as illustrated, thus

PH$_3$ + 3CH$_2$O + 3(CH$_3$)$_2$NH ⟶

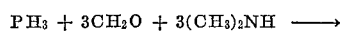

P(CH$_2$NR$_2$)$_3$ $\xrightarrow{3\text{ClCH}_2\overset{O}{\overset{\triangle}{\text{CHCH}_2}}}$

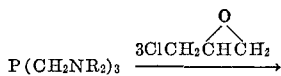

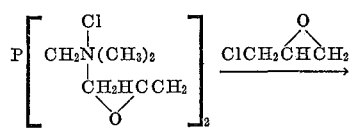

C$_6$H$_5$PH$_2$ + 2CH$_2$O + 2(CH$_3$)$_2$NH ⟶

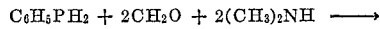

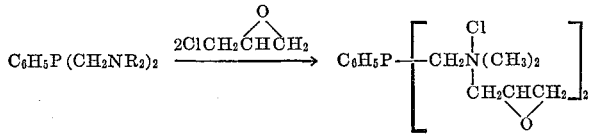

(C$_6$H$_5$)$_2$PH + CH$_2$O + (CH$_3$)$_2$NH ⟶

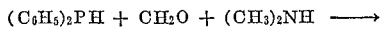

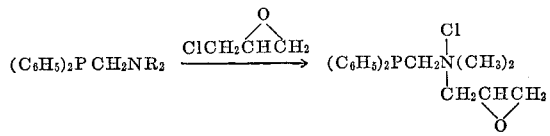

An extraordinary large number of amines are available commercially for conversion to the mono- and poly-epoxyonium compounds used in the practice of this invention by the reactions given in Equations 1, 2, 3, and 5 hereinabove. A few among the many available from commercial sources, listed in the 1970–1971 Laboratory Guide of the American Chemical Society, Aldrich Chemical Catalogue No. 5, and Eastman Organic Chemicals List No. 45, are:

trimethylamine, triethylamine, tripropylamine, tributylamine, triallylamine,
tribenzylamine, tridecylamine, triheptylamine, trioctylamine, tripentylamine,
triisopentylamine, N-methyldibenzylamine, N,N-dimethylbenzylamine,
N,N-dimethylallylamine, N,N-diethylallylamine, tripropargylamine,
N,N,N',N'-tetramethyl-2-butene-1,4-diamine,
N,N,N',N'-tetramethyl-2-butyne-1,4-diamine,
N,N,N',N'-tetramethyldiaminomethane,
N,N,N',N'-tetramethylethylenediamine,
N,N,N',N'-tetramethyl-1,6-hexanediamine,
N,N,N',N'-tetramethyl-1,3-propanediamine,
triethanolamine, triisopropanolamine, N-methyl-N-propargylbenzylamine,
nitrilotriacetonitrile, N(CH$_2$CN)$_3$,
N,N,N',N'-tetraethylethylenediamine,
diethylaminoacetonitrile, (C$_2$H$_5$)$_2$NCH$_2$CN,
2-diethylaminoethanol, 2-dimethylaminoethanol, 2-dimethylaminoethyl acetate,
2-dimethylaminoethyl benzoate, N,N-dimethylglycine diethyl ester,
3-dimethylamino-1,2-propanediol, 3-diethylamino-1-propanol,
3,3',3''-nitrilopropionamide, pyridine, 2,2'-dipyridyl, N,N'-dimethylpiperazine,
cyclohexyldiethanolamine, N-ethyldibenzylamine, N-methyldiisobutylamine,
N,N,N',N'-2-pentamethyl-1,3-propanediamine,
N,N,N',N'-tetraallylethylenediamine,
N,N,N',N'-tetraisopropylethylenediamine,
N,N,α-trimethylbenzylamine, etc.

The following examples are given by way of illustration and not by way of limitation of the invention.

EXAMPLE 1

To a reaction vessel equipped with a stirrer, thermometer, gas inlet tube, refrigerated condenser (−20° C.) containing 600 g. of epichlorohydrin maintained at −5 to 0° C. there is added slowly over the period of one hour, 95 g. of trimethylamine, after which the reaction is continued at ambient temperature for five hours, yielding a crystalline precipitate. The crystals are isolated in a dry box, washed with ether and dried in vacuo at 35° C. to yield 240 g. of glycidyltrimethyl ammonium chloride (Compound A); M.P. 139–141° C.; epoxy number per mole, 0.98 (theory, 1.00).

Analysis.—Calc'd for C$_9$H$_{14}$ONCl (percent):

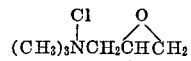

C, 47.5; H, 9.2; Cl, 23.4; N, 9.2. Found (percent): C, 47.2; H, 9.4; Cl, 23.6; N, 9.1.

EXAMPLE 2

In the apparatus of Example 1, a mixture of 30 g. of triethylamine and 30 g. of epichlorohydrin are stirred at 25° C. for ninety-six hours, yielding an oily lower layer which is separated and washed with ether in a dry box and cooled, yielding 19 g. of glycidyltriethylammonium chloride (Compound B); M.P. 32–35° C.; epoxy number per mole 0.98, theory 1.00.

EXAMPLE 3

In a suitable reaction vessel containing 70 ml. of dioxane, there is added 15 g. of trimethylamine and 29 g. of epibromohydrin. The reaction mixture is maintained at 0–20° C. by external cooling while it is stirred continuously for twenty hours, yielding white crystals which are collected by filtration in a dry box, washed with ether and dried in vacuo at 35° C. to yield 40 g. of glycidyl trimethylammonium bromide (Compound C); M.P. 151–153° C.; epoxy number per mole, 0.98, theory 1.00.

Substitution by 19 g. of trimethylphosphine, B.P. 40° C., for the 15 g. of trimethylamine, in the above procedure, yields the corresponding glycidyl trimethylphosphonium bromide (Compound D),

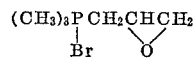

epoxy number per mole 0.97, theory 1.00, whereas substitution by 25 g. of triethylphosphine, B.P. 127° C., yields glycidyl triethylphosphonium bromide (Compound E), epoxy number per mole 0.965, theory 1.00.

EXAMPLE 4

By procedures similar to and related to those of Examples 1 to 3, the compounds listed in Column A are converted to onium compounds by reaction with the quaternization agents in Column B.

| Column A | Column B | Column C |
|---|---|---|
| $(CH_3)_2NCH_2CH_2N(CH_3)_2$ | 2 ClCH$_2$CHCH$_2$ (epoxide) | Compound F. |
| $(CH_3)_2NCH_2N(CH_3)_2$ | 2 BrCH$_2$CHCH$_2$ (epoxide) | Compound G. |
| $(CH_3)_2N(CH_2)_4N(CH_3)_2$ | 2 ClCH$_2$CHCHCH$_3$ (epoxide) | Compound H. |
| $(CH_3)_2NCH_2CH=CHCH_2N(CH_3)_2$ | 2 ICH$_2$CHCH$_2$ (epoxide) | Compound I. |
| $(CH_3)_2NCH_2C≡CCH_2N(CH_3)_2$ | 2 BrCH$_2$CHCH$_2$ (epoxide) | Compound J. |
| $(C_6H_5)_3P$ | ClCH$_2$CHCH$_2$ (epoxide) | Compound K. |
| $(C_4H_9)_3P$ | BrCH$_2$CHCH$_2$ (epoxide) | Compound L. |
| $(C_6H_5)_2PCH_2CH_2P(C_6H_5)_2$ | 2 BrCH$_2$CHCH$_2$ (epoxide) | Compound M. |

EXAMPLE 5

A series of mixtures of 5.0 g. of 3,4-epoxycyclohexylmethyl-3,4-epoxycyclohexane carboxylate (Ciba CY-197) and 5.8 g. of toluene diisocyanate is prepared. Mixture A is used as a control and to each of the remainder there is added various amounts of various catalysts, then the mixtures are heated at 70° C. The polymerization behavior as a function of time is summarized as follows:

| Catalyst | Weight percent | Description of polymer at time at 70° C. | | | |
|---|---|---|---|---|---|
| | | 30 minutes | 6 hours | 12 hours | 24 hours |
| None | 0 | No change | No change | No change | No change. |
| TMAC[1] | 1 | do | do | do | Slight increase in viscosity. |
| TMAC[1] | 3 | do | do | do | Do. |
| Compound: | | | | | |
| A | 1 | Slightly viscous | Very viscous | Soft polymer | Hard. |
| B | 1 | Viscous | Soft gel | Medium hard | Do. |
| C | 1 | Soft polymer | Hard | Very hard | Do. |
| D | 1 | do | do | do | Do. |
| E | 1 | do | do | do | Do. |
| F | 1 | do | do | do | Do. |
| G | 1 | do | do | do | Do. |
| H | 1 | do | do | do | Do. |
| I | 1 | do | do | do | Do. |
| J | 1 | do | do | do | Do. |
| K | 1 | do | do | do | Do. |
| L | 1 | do | do | do | Do. |
| M | 1 | do | do | do | Do. |

[1] TMAC is tetramethylammonium chloride.

The low molecular weight products obtained in experiments using TMAC were cloudy, containing undissolved TMAC. Similar unsatisfactory results are obtained if instead of TMAC, the corresponding tetramethylammonium bromide, $(CH_3)_4NBr$, is used. When an amount of ethanol equal in weight to the amount of TMAC is used with the TMAC, only a soft polymer is obtained in twenty-four to thirty-six hours.

EXAMPLE 6

This example illustrates polymer formation by the reaction of one mole of a bis-epoxy-onium halide with one mole of diisocyanate. There is mixed with 3.01 parts of ethylene bis-(glycidyldimethylammonium chloride), Compound F, 1.74 parts of toluenediisocyanate and the mixture allowed to stand at 25° C.; the mixture becomes very viscous in twelve hours and hard in thirty-six hours. When the original mixture is heated at 100° C., it becomes hard in approximately twenty minutes.

When 6.62 parts of ethylene bis-(glycidyldiphenylphosphonium bromide), Compound M, is substituted for the 3.01 parts of Compound F, the reaction mixture becomes a hard polymer at 100° C. in approximately twelve minutes.

EXAMPLE 7

A number of polyoxazolidones are prepared using toluene diisocyanate (TDI) 98%, with various diepoxides obtained from commercial sources; the ratio of TDI to the specific diepoxide being 1:1, in which the equivalents of the diepoxides are determined by analyses. To perform the polymerization 0.01 mole of TDI, 1.78 g., 0.01 mole of the diepoxide and 0.2 weight percent on the combined TDI and diepoxide of Catalyst F are placed in glass, screw-capped vials and flushed with nitrogen and heated at 85–90° C. with agitation until all of the catalyst dissolved in the mixture, then heating is continued at 90° C. for two hours during the course of which a considerable increase in viscosity occurs. The temperature of reaction mixture is then raised at a rate of 10° C. per hour to 130° C. and solid, hard, clear castings are obtained. The amounts of reagents used with 1.78 g. of TDI are shown in the following table:

| Polyepoxide | Eq. wt. mol. epox. | Grams used | Catalyst E, mg. used |
|---|---|---|---|
| 1,4-butanedioldiglycidyl ether (Ciba RD-2) | 133 | 2.66 | 8.88 |
| Vinylcyclohexenedioxide (Bakelite ERL-4206) | 94 | 1.88 | 7.32 |
| Bis-(2,3-epoxycyclopentyl ether) (Bakelite ERL-4205) | 100 | 2.00 | 7.56 |
| Bis-phenol-A-diglycidyl ether (Shell Epon 828) | 170 | 3.40 | 10.36 |
| Resorcinol diglycidyl ether (Koppers) | 115 | 2.30 | 8.16 |

At the end of the 90° C. heating period, the viscosities of the polymers are particularly suitable for use as solventless adhesives, potting and encapsulating compounds, impregnants for paper, cloth and glass fabric, chopped fabric, chopped glass fibers and the like; as well as for varnishes by dilution with such solvents as acetone, dioxane, ethyl acetate, etc. At the end of the 110° C. period, the polymers are poorly soluble in these solvents, but are soluble in aprotic polar solvents such as dimethylformamide, dimethylacetamide, dimethylsulfoxide and the like. However, at the end of the 130° C. period, the polymers are insoluble in the aprotic polar solvents.

Post-curing of the polymer is achieved by heating at 150° C. for twenty-four hours.

EXAMPLE 8

The procedure of Example 7 is repeated using the phosphonium Compound M as the catalyst instead of the ammonium Compound F, and substantially identical results are obtained, except that the rate of polycondensation is slightly lower.

EXAMPLE 9

In 105 parts of dimethylformamide there is dissolved 17.8 parts of Dow epoxy novolac resin DEN438 having the formula

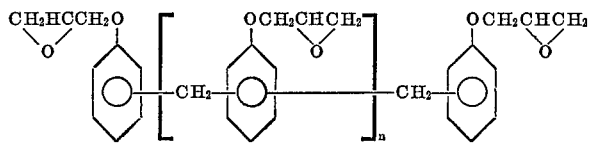

wherein $n$ has an average value of 1.6 and the epoxide equivalent weight is 178, 8.2 parts of toluene diisocyanate and 0.13 part of Compound A, and the mixture heated at 100° C. for thirty minutes, yielding a viscous varnish particularly suited for impregnating non-woven glass mats.

A varnish having similar properties is obtained when Compounds D or L are used as catalysts instead of Compound A.

EXAMPLE 10

In 100 parts of dimethylformamide there is dissolved 13.7 parts of commercial polymethylene-phenyleneisocyanate,

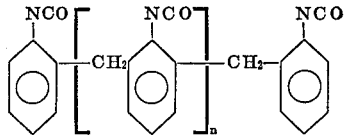

wherein $n$ has an average value of 2.1 and the isocyanate weight is 137, 17.0 parts of Shell Epon 828 and 0.25 part of Compound K and the solution processed by the procedure of Example 9, yielding a viscous varnish.

EXAMPLE 11

The procedure of Example 7 is repeated using instead of TDI an equivalent weight of hexamethylenediisocyanate, 1,5-naphthalene diisocyanate, and 1,4-xylylidene diisocyanate, respectively, and in all cases, high molecular weight polyoxazolidone polymers are obtained.

EXAMPLE 12

A mixture of 9.4 parts of vinylcyclohexenedioxide, 8.4 parts of toluene diisocyanate and 37 mg. of catalyst A or 45 mg. of catalyst E are heated with stirring at 90° C. under nitrogen until a very viscous but flowable polycondensation is obtained. Then a thin layer of this viscous intermediate is spread as an adhesive between (1) overlapping glass slides,
(2) two strips of aluminum,
(3) two strips of copper, and the sandwiches heated at 125° C. for ten hours. In all cases tenaceous bonds are obtained.

EXAMPLE 13

The reactants used in Example 12 are mixed and heated under nitrogen at 90° C. until a homogeneous mixture is obtained which is then cooled to room temperature. The slightly viscous mass is then poured over electrical components fixed in a metal container which is degassed under a reduced pressure of 5 mm. Hg pressure at 30° C. and placed in a heating chamber in which the temperature is raised at a rate of 10° C. per hour to 130° C., at which temperature it is cured for five hours. A void-free, water- and moisture-proof encapsulation is obtained.

What is claimed is:

1. A process for preparing a polyoxazolidone which comprises reacting a poly(1,2-epoxide) with an organic polyisocyanate in the presence of at least 0.005 percent by weight, based upon the combined weight of said epoxide and said isocyanate reactants, of an organic onium halide selected from the class of ammonium and phosphonium halides possessing at least one and no more than four oxirane groups, said onium halide being selected from the class of compounds having the formulas

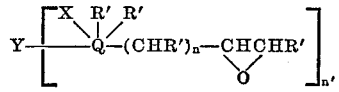

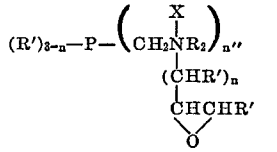

and

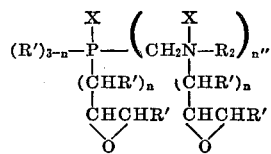

wherein
Q represents an atom selected from the class consisting of P and N,
$n$ represents an integer having a value of zero to ten,
$n'$ represents an integer having a value of one or two,
$n''$ represents an integer having a value of one to three,
X represents a halogen, and
when $n'$ is one, Y represents R, and
when $n'$ is two, Y represents R''.
wherein
R represents a monovalent aliphatic hydrocarbon radical containing at least one and no more than ten carbon atoms,
R' is a radical selected from the class consisting of R radicals and aromatic hydrocarbon radicals containing at least six and no more than twelve carbon atoms, and
R'' represents a divalent aliphatic or aromatic hydrocarbon radical containing at least one and no more than twelve carbon atoms.

2. The process of claim 1 in which the onium halide is

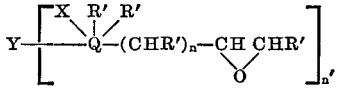

3. The process of claim 2 in which the polyisocyanate is an aryl diisocyanate.

4. The process of claim 2 in which the polyisocyanate is toluene diisocyanate.

5. The process of claim 2 in which the polyepoxide is

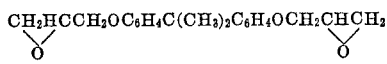

6. The product produced according to process of claim 2.

7. The product of claim 6 in which the reaction mixture consists essentially of a diisocyanate and a depoxide and an onium halide in which $n'$ is one.

8. The product of claim 6 in which the reaction mixture consist essentially of a diisocyanate and a diepoxide and an onium halide in which $n'$ is two.

9. The product of claim 8 in which the onium halide represents at least 0.05 molar percent of the diepoxide concentration.

10. The condensation product of claim 7 in which said reactants comprise an organic polyisocyanate and a compound of the formula

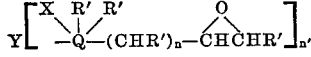

11. The process of claim 2 in which both said polyisocyanate and said poly(1,2-epoxide) are bifunctional.

12. The process of claim 11 in which the onium halide contains one oxirane group.

13. The process of claim 11 in which the onium halide contains two oxirane groups.

14. The process of claim 1 in which Q is nitrogen.

15. The process of claim 1 in which Q is phosphorus.

16. The process of claim 1 in which $n'$ is one.

17. The process of claim 1 in which $n'$ is two.

References Cited

UNITED STATES PATENTS

| | | | |
|---|---|---|---|
| 2,131,120 | 9/1938 | Schlack | 260—2 |
| 3,510,246 | 5/1970 | Keen et al. | 260—567.6 |
| 3,020,262 | 2/1962 | Speranza | 260—47 |

WILLIAM H. SHORT, Primary Examiner

T. E. PERTILLA, Assistant Examiner

U.S. Cl. X.R.

117—124 E, 128.4, 127, 155 R, 169 R; 260—9, 18 PF, 37 EP, 59.67 TN, 77.5 AB, 831, 834